United States Patent [19]

Van Weerden et al.

[11] Patent Number: 4,854,953
[45] Date of Patent: Aug. 8, 1989

[54] AIR FILTER AND MODULE TO BE USED FOR BUILDING UP SUCH A FILTER

[75] Inventors: Jan Van Weerden, Zundert; Johannes Valkenburg, Rotterdam; Ferdinand van der Spek, Breda, all of Netherlands

[73] Assignee: Filtrete B.V., Netherlands

[21] Appl. No.: 136,135

[22] Filed: Dec. 21, 1987

[30] Foreign Application Priority Data

Dec. 24, 1986 [NL] Netherlands ............... 8603306

[51] Int. Cl.⁴ ............................................. B01D 46/00
[52] U.S. Cl. ........................................ 55/483; 55/484; 55/509; 55/521
[58] Field of Search ................ 55/341 R, 483, 378, 55/484, 497, 507, 509, 521, 508, 514; 210/232, 323.2

[56] References Cited

U.S. PATENT DOCUMENTS

| | | | |
|---|---|---|---|
| 3,247,652 | 4/1966 | Annas et al. | 55/483 |
| 4,056,375 | 11/1977 | Ringel | 55/483 |
| 4,300,927 | 11/1981 | Day | 55/378 |

FOREIGN PATENT DOCUMENTS

| | | | |
|---|---|---|---|
| 713869 | 4/1968 | France. | |
| 255947 | 2/1949 | Switzerland | 55/378 |
| 2036591 | 7/1980 | United Kingdom. | |
| 409450 | 5/1984 | United Kingdom. | |

*Primary Examiner*—Bernard Nozick
*Attorney, Agent, or Firm*—Brumbaugh, Graves, Donohue & Raymond

[57] ABSTRACT

An air filter of which the dimensions may be easily adapted to the shape and dimensions of air ducts, especially air ducts of air condition equipments, comprises a number of frame shaped modules (1) made of plastics material. To each module a filter bag (2) is welded. The side faces (1a, b, c, d) of each module are provided with a system of ribs (5) or embossments (6). For joining modules substantially airtightly together a system of ribs or embossments on a side face of a module is connected to a complementary shaped system of ribs or embossments on the side face of another module by sliding movement or snap action. Preference is given to an embodiment whereby inclined side boundaries of interengaging complementary systems form a dovetail connection.

7 Claims, 2 Drawing Sheets

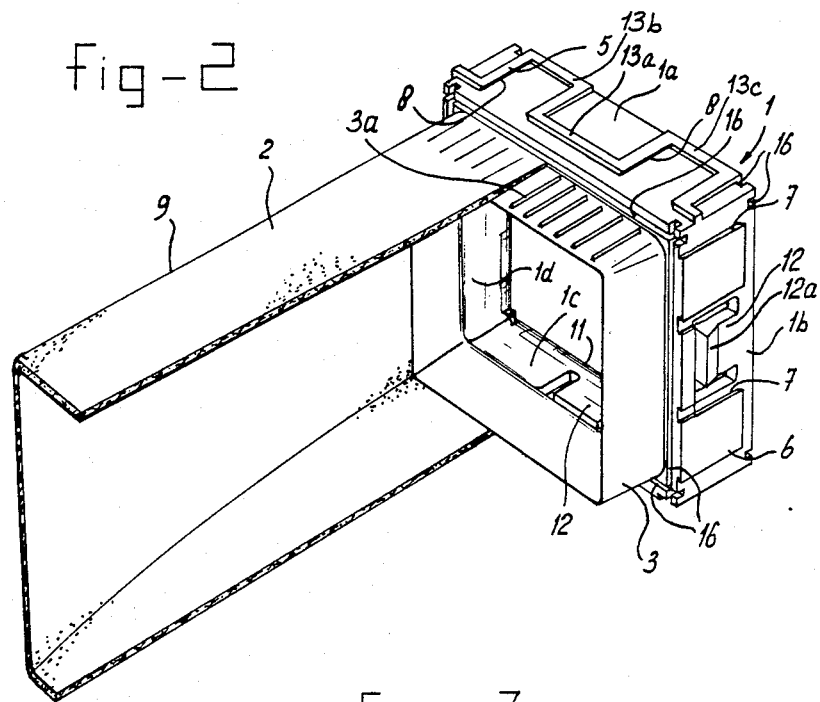
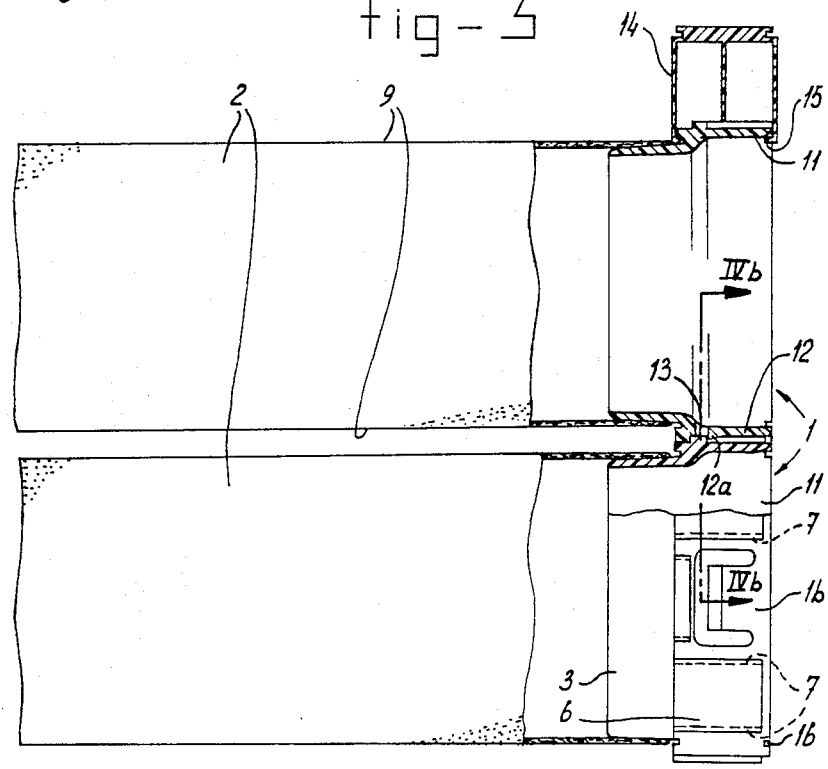

AIR FILTER AND MODULE TO BE USED FOR BUILDING UP SUCH A FILTER

The invention relates to an air filter comprising a number of frames substantially airtightly joined together each of the frames being provided with a filter.

Such an air filter is known from GB-A-2 036 591.

Air filters are very widely used in air conditioning installations for the purpose of removing particles of matter from a current of air. Electrete material known under the trade name "Filtrete", in particular, leads to excellent results because both negative and positive electrical charges are permanently incorporated in the surface of the fibres. Charged and uncharged particles of matter are collected: charged particles because they are attracted by strong Coulomb forces, and uncharged particles because they are polarized by the strong field around the fibres and converted into macroscopic dipoles, so that they are attracted. Because the particles are atrarcted by the fibres, the structure of the filter material can be open, so that air resistance is low. In conjunction with the charges in the fibres, the open structure leads to high capacity. The material repels moisture and is resistant to long-lasting temperature loads up to 80° C. and to temperature loads of short duration up to 100° C.

A fastening moulding is mounted in a duct in the air circulation system and in it a frame containing the fibrous filter material is fastened. The outside dimensions of the frame are obviously adapted to the inside measurements of the fastening moulding. In practice there are numerous shapes and dimensions of air ducts, depending on the desired filter capacity and the type of construction. Adaptation is expensive and laborious.

The frames of the air filter according to GB-A-2 036 591 are made of thin wire; adjacent parts of the wire frames are joined together by U-shaped clamping members. This joining system is working to connect the frames in one direction only, that is to say that a filter composed of these wire frames has a variable length of the cross section and a fixed width. The adaptation of this filter construction to the dimensions of air ducts is rather inadequate. Further the airtightness of this frame connection with the aid of U-shaped clamping members leaves a lot to be desired.

The main object of the invention is to avoid these disadvantages and to provide an air filter of which the dimensions may be easily adapted to the shape and dimensions of air ducts.

According to the invention the frames are modules made of plastics material and the side faces of each module are provided with a system of ribs or embossments, whereby for joining the modules airtightly together a system of ribs or embossments on a side face of a module is connected to a complementary shaped system of ribs or embossments on the side face of another module by sliding movement or snap action.

The modules can be assembled to form frames of any desired dimensions, provided that attention is paid to the need for each outside dimension of the frame to be a whole multiple of the length of one side of the module. It is also possible for a frame composed of modules to be disposed in circular ducts provided that the relatively small segmental spaces between the outside periphery of the frame and the inside periphery of the air duct are masked off. Square modules for example have a side length of about 95 millimeters. The maximum possible use can also be made of a round cross-section of an air duct with the largest possible filter area.

An important advantage is that the suppliers of the air filters do not need to hold stocks of a large number of filters of different dimensions.

It is essential that the modules can be airtightly joined together without additional means, that is to say solely with means which are fixed components of the modules.

It is strongly preferred that the side boundaries of said ribs or embossments are inclined with respect to the plane of the side wall and that the side boundaries of joined together complementary systems form a dovetail connection.

If the side boundaries of the systems of ribs or embossments have a crenellated shape, the air flowing into the dovetail connections will undergo twice a flowing direction change of 90°. This causes such an increased resistance that the air will follow the way of lesser resistance through the filter.

The modules should not move with respect to each other; therefore one of two joined together side faces is provided with a resilient locking member snapped behind an edge of the other side face.

To avoid openings between the joined modules the circumferential shape of the modules is triangular, quadrangular, rectangular or hexagonal and the modules are joined together in two directions without any openings there between.

In case of a rectangle the length of the long side should be a whole multiple of the length of the short side.

The filter bags can be supported internally and externally, but it is simpler and more economical for the bags to be self-supporting, that is to say able to extend straight from the frame without any resistance. This self-supporting feature can be assisted if the filter bags simply have two longitudinal weld seams diagonally opposite each other.

Further the invention relates to a module made of plastics material, the side walls being provided with ribs or embossments of which the inclined side boundaries are arranged according to a crenellated pattern.

Preference is given to a square shape of the module and the system of ribs or embossments of two side faces being complementary to the ribs or embossments on two other side faces of that module so that one system of a side face of a module may joined airtightly to the other complementary system of a side face of another module by interengaging complementary systems.

In order to achieve low air resistance, the internal surface of the modules is aerodynamically shaped.

The invention will now be explained more fully with the aid of the drawing, in which one example of embodiment is illustrated.

FIG. 2 shows in perspective an elevation of a module of the filter shown in FIG. 1, with the filter bag partly cut away.

FIG. 3 is a longitudinal section through two modules fastened to one another.

Figure 1:
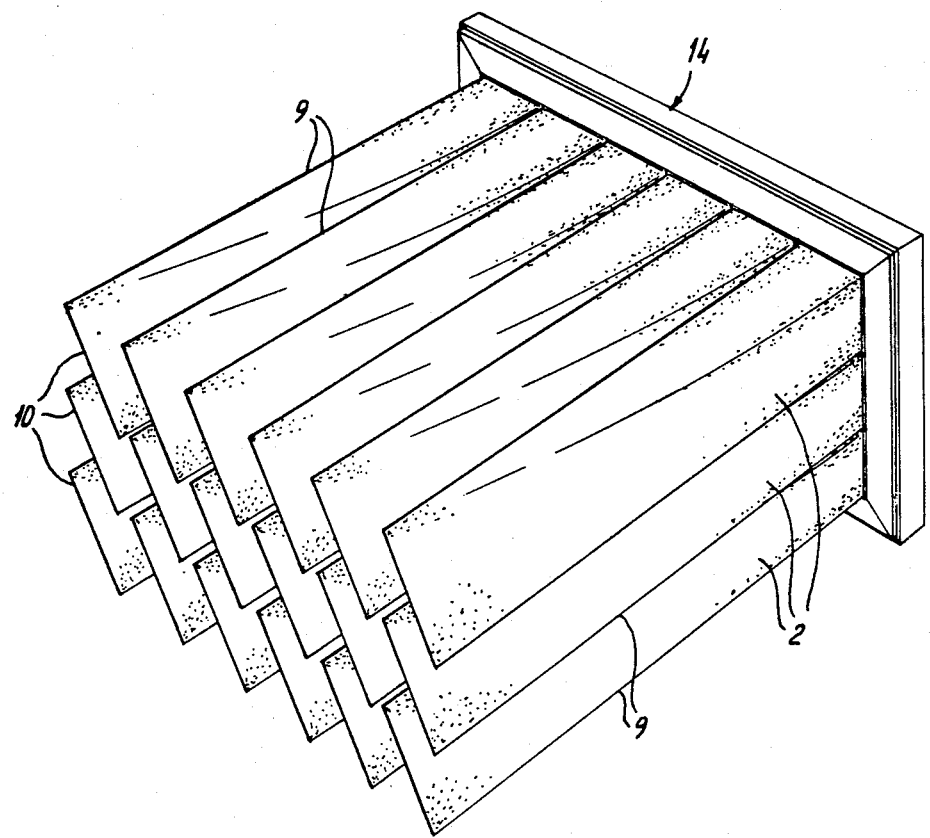
FIG. 1 shows in perspective an elevation of an air filter according to the invention.

The air filter shown in FIG. 1 comprises a frame constructed of modules 1 and filter bags 2, the number of the latter corresponding to the number of modules.

Each of the modules 1 is made by injection moulding of plastics material and has the form of a square frame having a projecting edge 3, to which a filter bag 2 is fastened by welding. The material of the filter bags consists of weldable plastics fibres.

The projecting edge 3 is provided with ribs 3a melting during the welding operation and penetrating through the filter material.

The side faces of the modules are provided with a rib system 5 and a system of embossments 6. The embossment system 6 of the side face 1c, which is directly opposite to the side face 1a, corresponds to the embossment system of the side face 1b. The rib system of the side face 1d, which is directly opposite the side face 1b, corresponds to the rib system 5 of side face 1a.

The side boundaries of the embossment system 6 of the side faces 1b and 1c as well as the side boundaries of the ribs of the rib system 5 of the side faces 1a and 1d are provided on the outer periphery with inclined bounding faces 7 resp. 8. The embossment system 6 of face 1b or 1c can be pushed into the rib system 5 of a face 1a or 1d of another module, the aforesaid inclined bounding faces interengaging after the style of a dovetail arrangement. If the systems 5, 6 are made with precision, it is possible in this way to obtain a firm practically air tight connection between the modules. The connection can be made very quickly. As the name itself suggests, the modules are of standard dimensions. The length of the side of the square is for example 9.5 centimeters, and the total height is 4.5 centimeters.

The inclined bounding faces of the systems 5 and 6 have a crenellated pattern. The resulting frame can be fastened in an existing or specially installed mounting moulding in the air duct.

Air filters of widely varying dimensions and shapes can be produced with the aid of the modules, but the outside dimensions must always amount to a whole number times the length dimension of the modules. A U-shaped main frame 14 can be applied around the complete filter; transverse edges 15 of frame 14 fit into notches 16 in the modules.

The filter bags consist of two strips of filter material joined together along two longitudinal weld seams 9 and a single transverse weld seam 10. The longitudinal seams 9 contribute towards ensuring that the bag will be self-supporting throughout its useful life, that is to say that no additional means will be required to enable the bag to project at right angles to the frame. The initial resistance of the filter bags is relatively low and their life is long.

An important advantage of the invention is that for any dimensions and shape of the duct in which an air filter has to be installed the manufacturers of the air filters need manufacture and keep in stock only modules of standard dimensions.

Furthermore, the users can adapt the number of modules to the desired air flow to be filtered, taking into account the desired filter efficiency, because the modules are manufactured in such a manner that they can offer different efficiencies irrespective of the rate of flow of the air through the filter. If the duct opening is larger than desired, a part of the opening can be blanked off with dummies of the same size as the modules but having an impermeable plastics wall instead of a filter bag.

A filter of the desired dimensions can quickly be assembled with the aid of modules. Polypropylene is a preferred material for the modules, but other plastics materials can also be used.

The inlet rim 11 of the modules is streamlined in order to keep resistance low. The inclined bounding faces of systems 5 and 6 have a crenellated pattern. By the crenellated pattern of the dovetail connections a kind of labyrinth sealing is obtained causing such a great resistance that the air will follow the way of smaller resistance through the filter.

The side faces 1b and 1d are provided with a resilient locking member 12 having a thickened portion 12a which in the locking position interlocks with rib 13 of rib system 5. By this construction two connected modules can not move with respect to each other.

Many modifications of the above described construction are possible within the scope of the invention.

We claim:

1. An air filter comprising:
    a plurality of filter elements; and
    a plurality of module frames each of which has a projecting edge onto which one of said filter elements is secured, a first pair of side faces provided with a plurality of spaced ribs disposed parallel to a central axis of the frame and each being profiled on at least one of its side boundaries and a plurality of ribs disposed perpendicular to said spaced ribs in the spaces between the spaced ribs and a second pair of side faces having an embossment profiled on its side boundaries in complement to the profile of said profiled side boundaries of said ribs in such a manner that an embossment of a first frame can be slidingly directed in the space between two spaced ribs of a second frame to enable end boundaries of said embossment to contact at least one of said perpendicular ribs of said second frame when the module frames are interconnected.

2. The air filter according to claim 1 wherein the side boundaries of said ribs and embossments are inclined with respect to the plane of the side wall and the interengaging complementary side boundaries form a dovetail connection.

3. The air filter according to claims 1 or 2 wherein the side boundaries of the ribs and embossments have a crenellated shape.

4. The air filter according to claims 1 or 2,
    wherein the embossment is provided with a resilient locking member
    having a thickened portion which contacts a perpendicular rib when the modules are connected.

5. The air filter according to claims 1 or 2
    wherein the filter elements are self-supporting filter bags secured with their mouth to the projecting edge of a module.

6. The air filter according to claim 5, wherein the filter bags have two longitudinal seams disposed diagonally opposite each other.

7. A frame for use in an air filter of the type having a plurality of interconnected frames, comprising:
    a rectangular module having a projecting edge onto which a self-supporting filter bag is secured, a first pair of side faces provided with a plurality of spaced ribs disposed parallel to a central axis of the frame and each being profiled on at least one of its side boundaries and a plurality of ribs disposed perpendicular to said spaced ribs in the spaces between the spaced ribs and a second pair of side faces having an embossment of a width substantially the same as the distance between said spaced ribs and profiled on its side boundaries in complement to the profile of said side boundaries of said ribs.

* * * * *